United States Patent [19]

Masood

[11] Patent Number: 5,559,983
[45] Date of Patent: Sep. 24, 1996

[54] SINGLE CHIP CONTROLLER FOR OPTICAL DATA DISK DRIVES

[75] Inventor: Shakeel Masood, Sunnyvale, Calif.

[73] Assignee: Advanced Micro Devices, Inc., Sunnyvale, Calif.

[21] Appl. No.: 291,814

[22] Filed: Aug. 16, 1994

Related U.S. Application Data

[63] Continuation of Ser. No. 813,275, Dec. 24, 1991, abandoned.

[51] Int. Cl.$^6$ .................................................. G06F 11/30
[52] U.S. Cl. ........................... 395/439; 395/404; 395/431; 364/DIG. 1
[58] Field of Search .................................. 395/439, 404, 395/431

[56] References Cited

U.S. PATENT DOCUMENTS

| | | | |
|---|---|---|---|
| 4,525,839 | 6/1985 | Nozawa et al. | 371/10.2 |
| 4,698,810 | 10/1987 | Fukuda et al. | 371/37.7 |
| 4,800,550 | 1/1989 | Yamauchi | 369/59 |
| 4,862,443 | 8/1989 | Tsuji et al. | 369/59 |
| 4,969,139 | 11/1990 | Azumatani et al. | 369/54 |
| 5,063,549 | 11/1991 | Yamamuro | 369/44.28 |
| 5,220,545 | 6/1993 | Tomimitsu | 369/32 |
| 5,235,585 | 8/1993 | Bish et al. | 369/54 |

FOREIGN PATENT DOCUMENTS

| | | |
|---|---|---|
| WOA8906427 | 7/1989 | European Pat. Off. |
| 2241803 | 9/1991 | United Kingdom. |

OTHER PUBLICATIONS

Patent Abstract of Japan, Publication No. JP61026975, Publication Date Feb. 6, 1986.
Patent Abstract of Japan, Publication No. JP3240821, Publication Date Oct. 28, 1991.
Patent Abstract of Japan, Publication No. JP3245369, Publication Date Oct. 31, 1991.
Patent Abstract of Japan, Publication No. JP58181162, Publication Date Oct. 22, 1983.
Patent Abstract of Japan, Publication No. JP62102483, Publication Date May 12, 1987.
Patent Abstract of Japan, Publication No. JP1274516, Publication Date Nov. 2, 1989.
Database WPI, Sec. EI, Week 9309, Derwent Pubs. Ltd., London, GB; Class T03, AN 93–075936 & US5187615.

*Primary Examiner*—Reba I. Elmore

[57] ABSTRACT

Optical data controller (ODC) and Optical data encoder/decoder (ODE) functions are integrated on a common chip to carry out optical disk drive control. Programming and some circuit functions are shared by the ODC are ODE. Internal marks detection signals and developed by the ODC and ODE and ODE commands are made available on new output pins for external control functions and diagnostics.

17 Claims, 8 Drawing Sheets

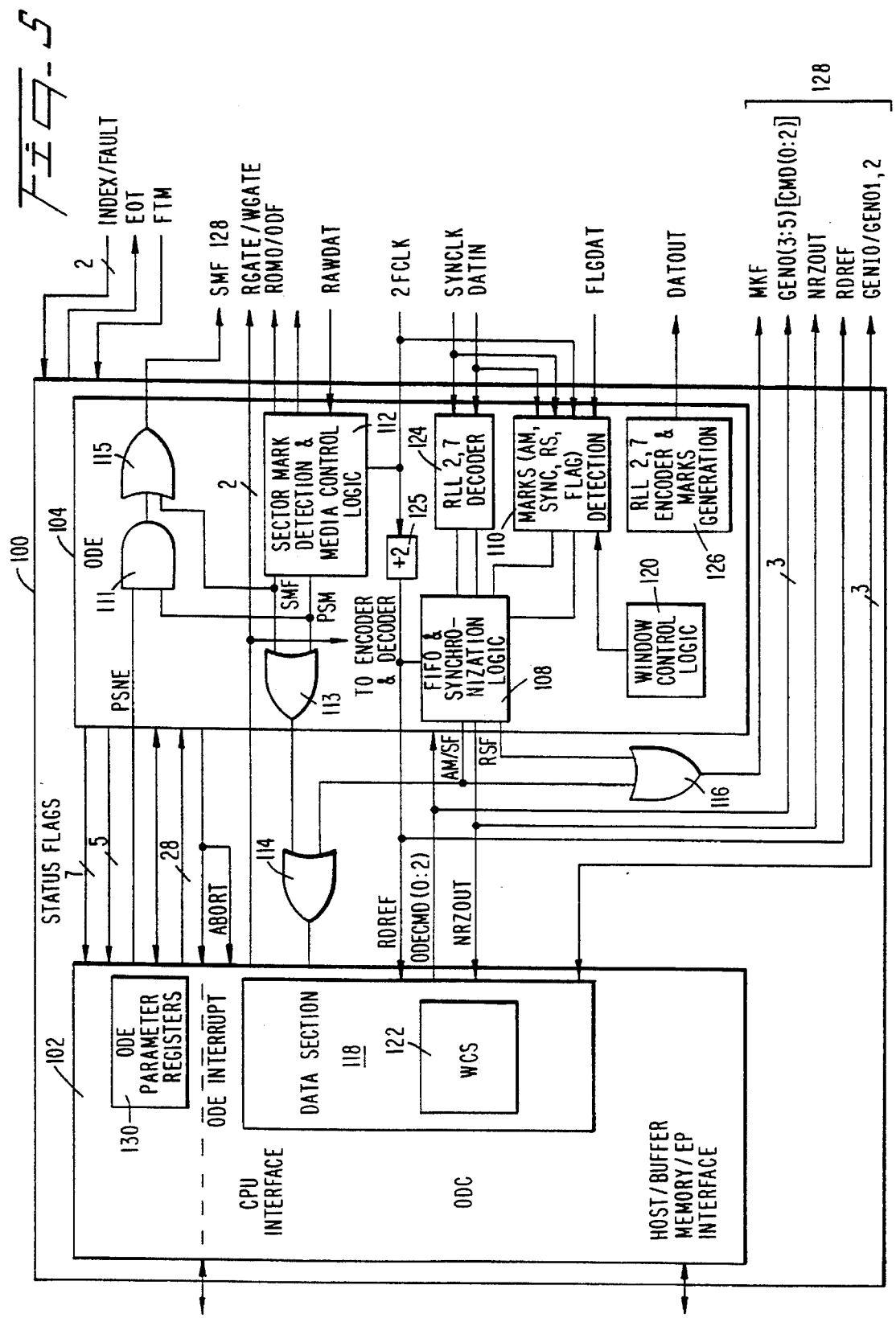

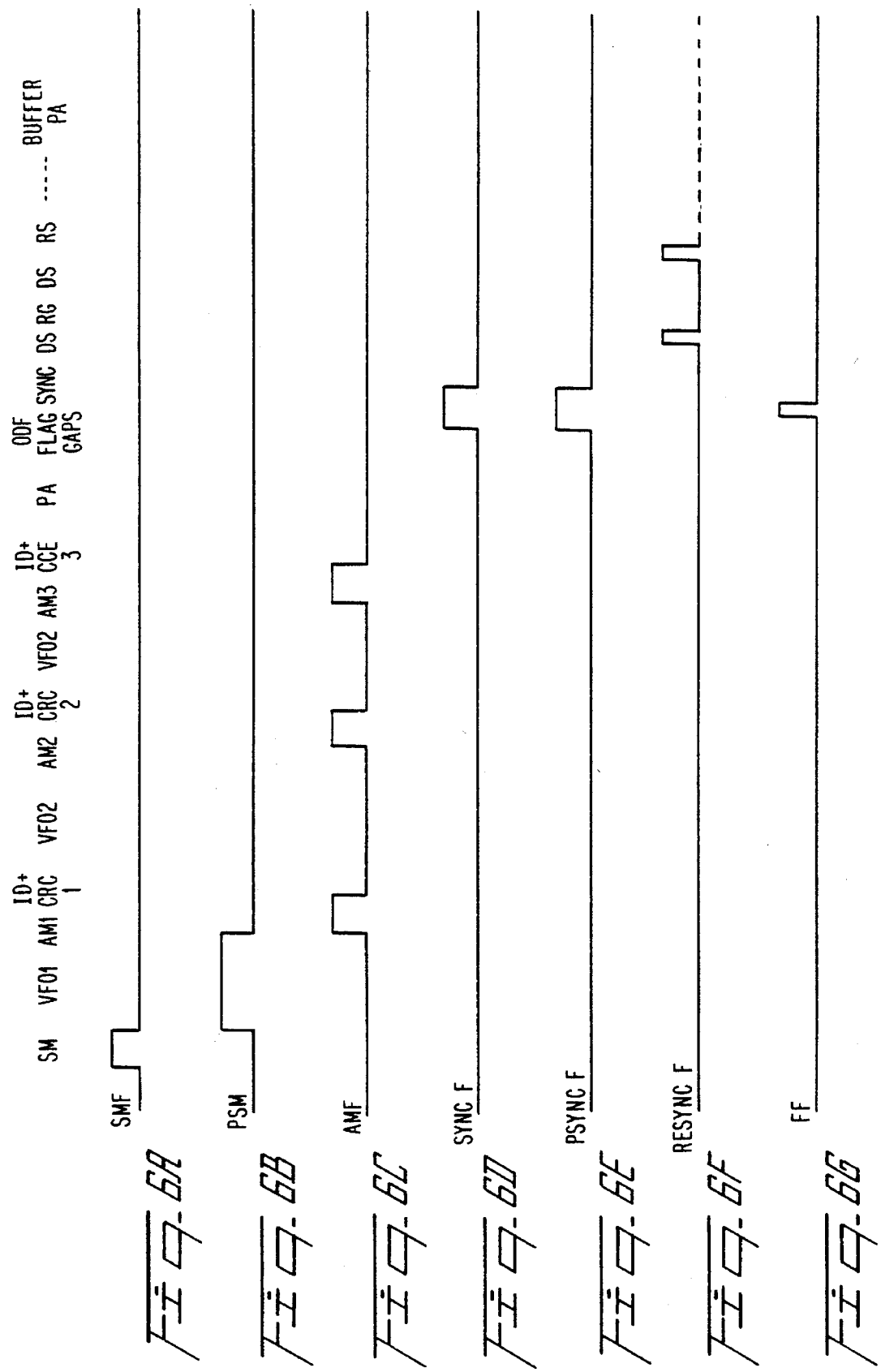

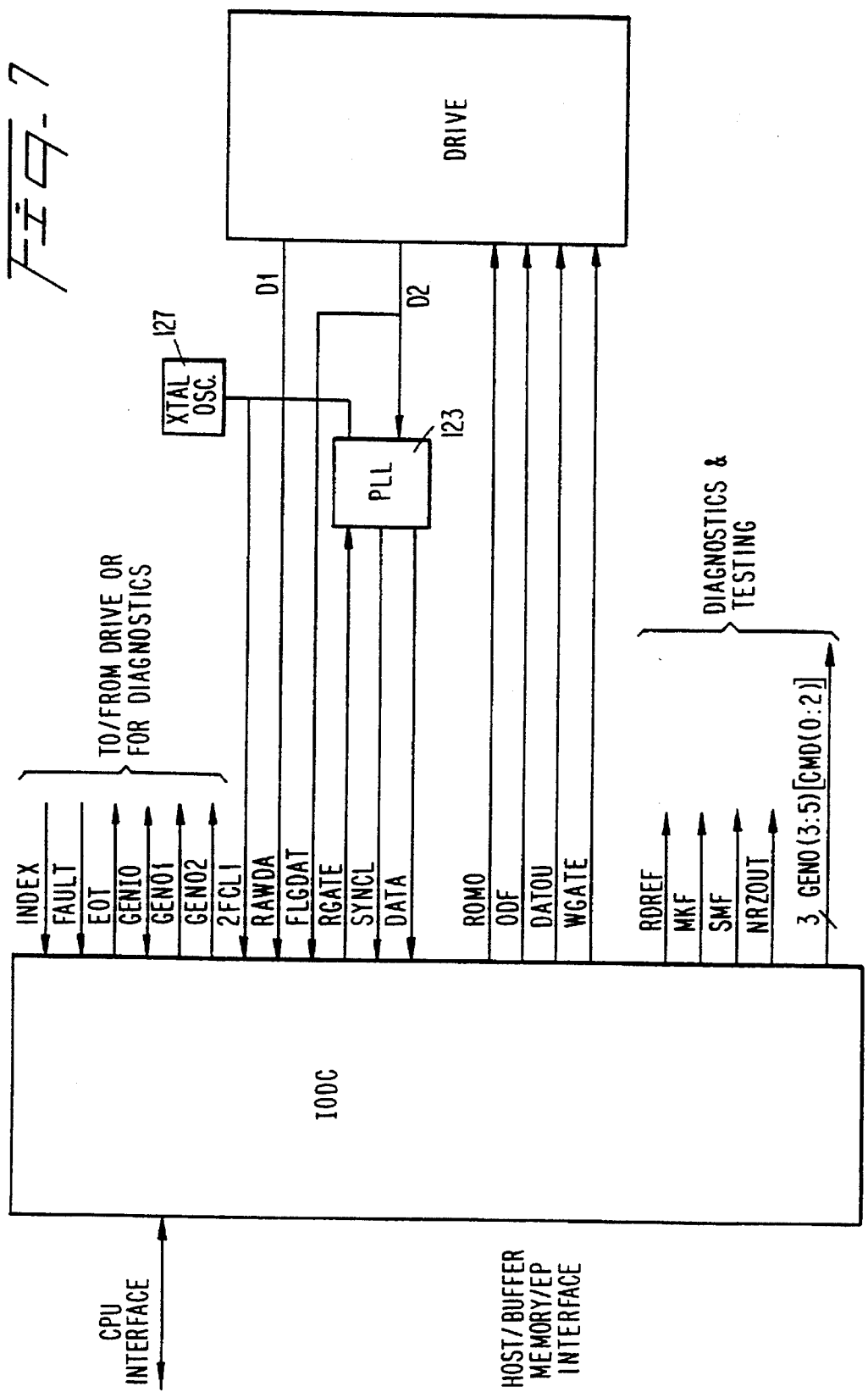

SINGLE CHIP CONTROLLER FOR OPTICAL DATA DISK DRIVES

This application is a continuation of application Ser. No. 07/813,275 filed Dec. 24, 1991, abandoned.

TECHNICAL FIELD

This invention relates generally to optical data disk drive controllers, and more particularly to a novel controller having optical disk controller (ODC) and optical data encoder-decoder (ODE) functions integrated on a common integrated circuit substrate.

BACKGROUND ART

Optical disk media are capable of storing a considerable amount of data in the form of small marks or holes in the surface of the disk, each representing a bit of data. The marks, burned into the surface of the disk by a laser, are arranged along spiral tracks, each divided into a number of sectors.

FIG. 1 is a diagram of an apparatus 10 for reading data prerecorded on an optical disk 12. The disk 12 is rotated by a disk servo 14 comprising a precisely controllable DC motor. A laser 16 irradiates the surface of the disk 12, and light reflected from the disk impinges on the surface of a detector 18. An optical head 20, located between the disk 12 and laser/detector 16, 18, is positioned by another servo (not shown) to read data from a desired track. Writing is carried out using similar optics, with the optical medium being preheated to enable light from laser 16 to form surface marks corresponding to data. The servos and laser/detector are controlled by a processor unit 22.

The components comprising apparatus 10 shown in FIG. 1 typically are arranged within a common housing, such as provided by SCSI (Small Computer System Interface) resident at a personal computer or other computer requiring storage of a large quantity of data.

Data read and write logic, implemented by processor unit 22 in the representative illustration of FIG. 1, has been carried out by commercially available special function integrated circuits, such as the AM95C96 optical disk controller (ODC), manufactured by Advanced Micro Devices of Sunnyvale, Calif. A system implementing the AM95C96, shown in FIG. 2, comprises ODC 24 reading data through an encoder/decoder (ODE) 28 and a phase locked loop (PLL) 30 off the optical disk and writing to the optical disk. A central processing unit (CPU) 32 controls seeking to the desired location on the disk. The ODC/ODE 24, 28 interfaces with CPU 32, working memory 34 and a disk interface 36 to process the applied data signals and transfer commands for compliance with particular specifications such as the X3B11 continuous composite servo (CCS), WORM/ERASABLE optical format developed by ANSI.

The ODC 24 is interfaced to a system bus by host interface unit 38, and is supported by buffer memory 40 and error processor 42. General operation of the system shown in FIG. 2, being known to the prior art, is not described in detail.

FIG. 3 depicts the layout of tracks on an optical disk. The tracks are arranged along a spiral path on the surface of the disk 12, with each turn of the spiral being treated as a separate track. In one example, the optical disk may be 90 mm in diameter, and may contain 10,000 tracks (numbered 0-9999 in FIG. 3); each track is divided into twenty-five (25) sectors. Each sector in turn will carry 725 bytes of unformatted data. The optical disk in this example is capable of storing 181,250,000 bytes of data, or about 100,000 pages of text. Modifications include implementing more densely packed sectors, larger diameter disks and/or double-sided storage for enhanced information storage capacity.

FIG. 4 is a field diagram of the X3B11 format, comprising a header area that is "pre-stamped", followed by a data area for receiving data for storage. The first field of the header is a sector mark (SM) having a special redundant pattern. This field identifies the start of a sector. The SM field as well as the other fields constituting the X3B11 format is summarized below in Table I.

TABLE I

| NAME | FUNCTION | PATTERN |
|---|---|---|
| SM | Sector Mark | 80 channel bits (5 bytes) Special Redundant Patterns $\underline{5}\ 3\ 3\ \underline{7}\ 3\ 3\ 3\ \underline{50}$ long burn followed by 0010010010 =1111111111000000111111000000000000001111110000001111110000001111111111 0010010010 |
| VFO1,2,3 | Lock up field for PLL | Continuous Pattern<br>VFO1 = 01001001001 . . . 010010<br>VFO2' = 10010010010 . . . 010010<br>VFO2" = 00010010010 . . . 010010<br>VFO3 = 01001001001 . . . 010010<br>Note: VFO2 varies depending on previous pattern in CRC. |
| AM | Address Mark (Bit/Byte Sync) 16 Channel bits. (1 byte) | 0100 1000 0000 0100 |
| ID | Track No. (2 bytes) Sector No. (1 byte) | High order/Low order bits 7–6=ID Number(ID 0–2) bit 5=0 Reserved bit 4–0=Sector Number |
| CRC | ID Field Check Bytes (2 bytes) | CRC Polynominal seed= 1's |
| PA | Postamble (one byte) | Allows last CRC and DAM byte closure under RLL (2,7) modulation |
| ODF | Offset Detection Flag (one byte) | Not written, no grooves |
| GAP | Gap (Splice) | Unformatted area |
| FLAG | Indicate Written Block | Continuous Pulse (5 byte area, decision by majority) 100100100100100100100100100 . . . |

TABLE I-continued

| NAME | FUNCTION | PATTERN |
| --- | --- | --- |
| ALPC | Auto Laser Power Control | Blank 2 bytes zone |
| SYNC | Redundant Sync for Data | Triple sync pattern |
| | 0100 0010 0100 0010 0010 0010 0100 0100 1000 0010 0100 1000 | |
| DATA | User Data, Control, CRC, ECC and RESYNC bytes. | See FIGS. 1.6 and 1.7. |
| BUFFER | Used for RPM timing margins | Not Written area |
| RESYNC | Data Field byte sync 16 Channel bits (1 byte) | 0010 0000 0010 0100 |

NOTE: All bit patterns show channel code bits in RLL (2,7) modulation.

During both reading and writing operations, ODE 26 detects sector mark (SM) once within each sector. Referring to Table I, the sector mark comprises 80 bits arranged as a long burn followed by a transition pattern. Sector mark decoding is carried out by monitoring the long burn pattern of the track, and identifying a pattern characteristic of the sector mark.

Detection of the sector mark pattern is a prerequisite to the reading of data from the corresponding sector. It identifies the region of each sector from which data is to be read because the data field is displaced from the sector mark by a defined number of bytes depending upon the particular standard involved. For example, in conventional X3B11 format, shown symbolically in FIG. 4, the pre-stamped, or read only (RO), region extends 47 bytes beyond the sector mark field SM, followed by a magneto-optic region (MO) upon which data can be written once (the MO region is also termed a "WORM", or write once-read many, region). The data region of a 90 mm, 512 byte sector size by convention follows the RO region by ODF and GAP bytes. The next sector mark field follows the data field by a buffer region of 13 bytes for timing margins.

Another prerequisite of reading data from the disk is byte and bit alignment of data taken off each sector for decoding. In the X3B11 specification shown in FIG. 4, a synchronization (sync) mark of 3 bytes, signifying the start of the sector data field, follows VFO3. There are also several re-synchronization (resync) marks of one byte each at regular intervals to ensure byte alignment throughout a read operation. Following a successful header operation, the VFO3 field is searched for presence of the sync mark. Upon detection of the sync mark, a "sync found" signal is generated by the ODE and the incoming data stream is decoded one block at a time while data synchronization between the data and decoder is maintained by alignment to the resync marks.

Although the necessary functions are carried out by the prior art controller of FIG. 2, integration of the principal components, the ODC 24 and ODE 28, on separate integrated circuit "chips" is disadvantegeous in several respects.

First, because there is duplication of "intelligence" on the ODC and ODE chips and incorporation of additional interface circuitry to establish comparability between the chips, circuit and pattern layout complexity is considerable. Circuit delay is relatively high as a result of the additional length of signal paths that must be traversed between chips during handshaking and other communications.

In addition, the pair of chips necessitates microprocessor address, data and control pins to transfer data and instructions between the chips. A high pin count diminishes the versitility of the controller by prohibiting the addition of new functions, such as diagnostics, requiring user access through the pins.

Separate chip architecture also possesses other deficiencies inherent to internal operation of the controller. For example, in the prior art controller of FIG. 2, during reading of the data field, the ODC reference clock, termed RDREF, provided to the ODC 24, is derived from the phase locked loop (PLL) 30. When the loop becomes unlocked, for example as a result of a defect in the medium, the timing signal will become unstable and the ODC has a tendency to "lock up." As another example, delays in signal transfer inherent in separate chip architecture can cause X3B11 disk format incompatability or operation failure. If a command to abort a disk operation is asserted by the ODE, signal transfer protocol that must be exchanged between its internal processor and an external, main sequencer resident with the ODC, may cause the abort to be fully implemented too late.

DISCLOSURE OF THE INVENTION

The above and other deficiencies of the prior art are addressed in the invention by implementing ODC and ODE functions on a common chip. More specifically, an integrated optical data disk controller, in accordance with one aspect of the invention, comprises, on a common semiconductor substrate, (1) optical encoder/decoder (ODE) circuitry for finding reference marks and decoding data from a bit stream taken from an optical data disk and for encoding and supplying data to the disk, and (2) optical data controller (ODC) circuitry interconnected with the ODE and a host interface and providing disk read/write data and control signals to an external disk drive unit and (3) signal flow paths for transferring signals between the ODC and ODE.

In accordance with another aspect of the invention, the ODE includes means for generating internal signals corresponding to the reference marks found on the disk, and at least one output pin, transfers these marks found signals outside the ODC/ODE substrate. The marks found signals preferably are superimposed on a common output pin. The ODC and ODE functions can be immediately aborted, or disk drive operation appropriately modified, in response to particular controller or disk media characteristics including defective media indicated by these internal signals together with status/interrupt signals provided to ODE registers in the controller.

In accordance with a further aspect of the invention, the ODC circuit includes a data section storing ODE commands for controlling functions of the ODE circuit. External pins are coupled to the data section for reading the ODE commands issued by the ODC to the ODE.

A still further aspect of the invention provides the ODE circuit with window control logic for establishing windows of predefined sizes for searching disk sectors to find various reference marks. Preferably, the data section of the ODC circuit stores data predefining the search window sizes.

In another aspect, the ODE circuit includes synchronization logic means responsive to sync and resync signals developed by the ODE circuit for supplying decoded data from the disk to the ODC. A crystal-controlled clock provides a source of synchronization to the ODC and synchronization logic means.

Another aspect of the invention provides optical encoder/decoder (ODE) circuitry for detecting reference marks and decoding data taken from said disk and for encoding and supplying data to the disk together with optical data controller (ODC) circuitry interconnected with the ODE and a host interface.

Preferably, external pins are coupled to the data section for enabling a user to monitor the ODC commands.

Integration of the ODC and ODE functions as described shares circuit functions, reducing the amount of circuitry required to be implemented on the chip and increasing the speed of signal processing. The invention further provides availability of additional circuit pins for user diagnostics. For example, X3B11 specification marks, that is, sector mark, sync and resync, are supplied to a new "marks found" pin where the various marks can be distinguished from one another on the pin based upon differences in length and position.

Another advantage of the invention is in common integration of programming for the ODC and ODE functions and availability of ODE command signals on a new set of "command" pins available to the user for diagnostics and debugging. Operation of the controller optionally can be aborted based upon information obtained from the status flags sent to a main sequencer of the controller chip. Abort is immediately carried out because the additional stages of abort operation necessary when internal and external (main sequencer) microprocessors must communicate with each other in the separate chip architecture is avoided.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 5 is a block diagram of a optical disk controller having integrated ODC and ODE functions in accordance with the invention.

FIGS. 6(a)–6(g) show timing relationships among reference mark signals produced by the controller.

FIG. 7 shows how the integrated ODC/ODE system of the invention is interconnected to timing reference sources and a disk drive unit.

BEST MODE FOR PRACTICING THE INVENTION

Figure 3:
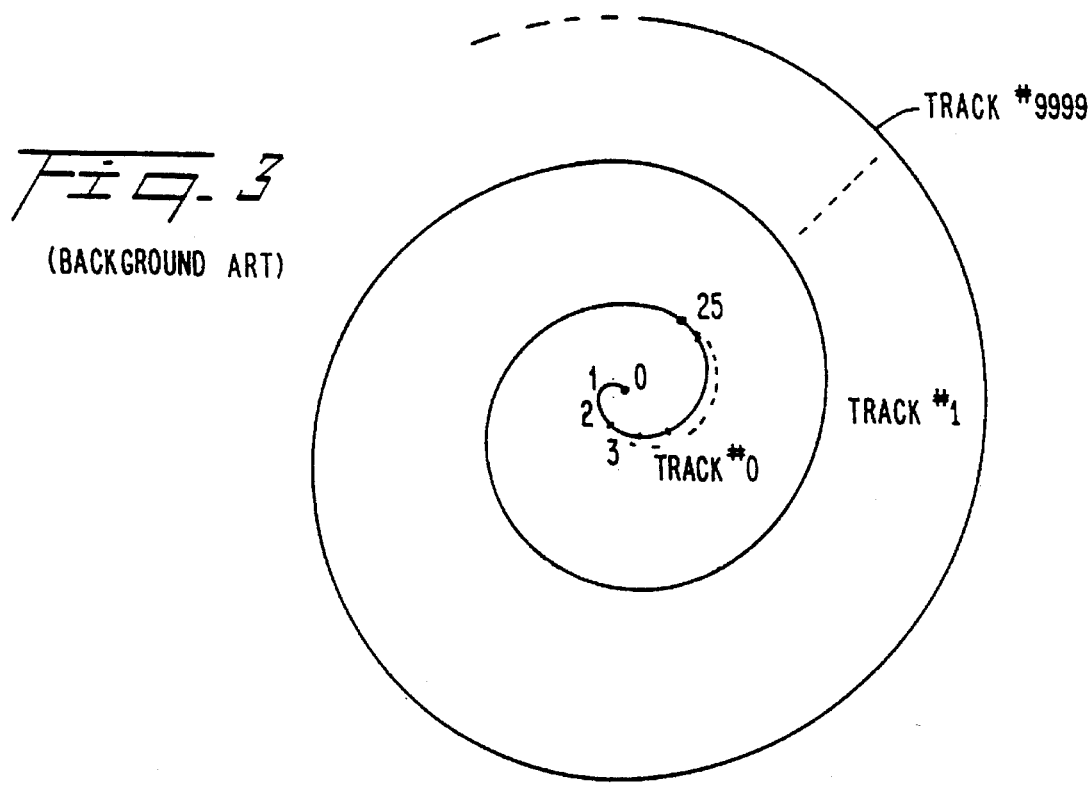
FIG. 3 is a diagram showing a track format of an optical data disk.
Figure 1:
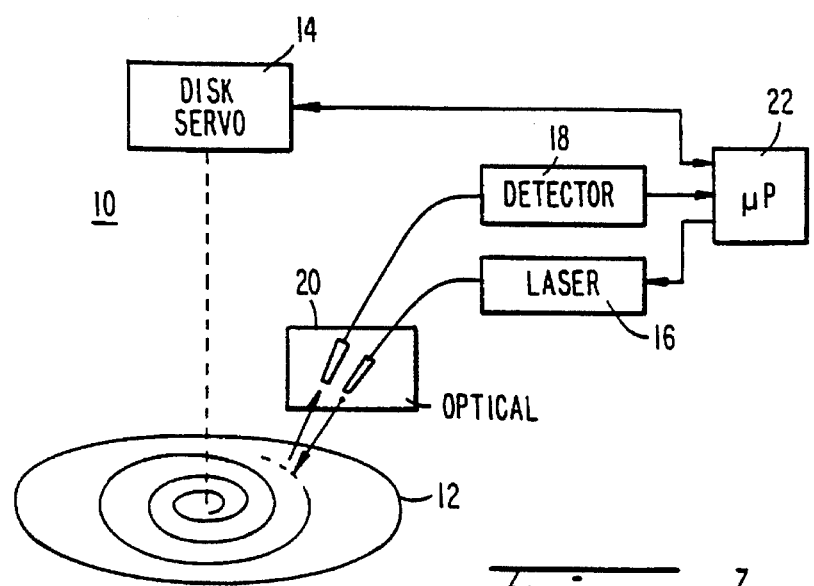
FIG. 1 is a simplified diagram of an optical disk read/write system within which the present invention may be implemented.

The invention is implemented by circuitry shown in FIG. 5 with optical disk controller (ODC) and optical data encoder-decoder (ODE) functions on a common semiconductor substrate (chip) 101 to form an integrated optical disk controller (IODC) 100. IODC 100 comprises ODC and ODE regions 102, 104 depicted in the Figure as being isolated in separate portions of the chip but in practice may be arranged differently based upon circuit layout constraints. The ODC 102 is similar to ODC 24 of the prior art, although programmed slightly differently and modified somewhat to accommodate new signals developed by the ODE 104; however, the ODE 104 has been modified considerably from the counterpart prior art ODE 28.

ODE 104 contains five principal functional circuits in addition to a FIFO and synchronization logic unit 108 to be described later with reference to FIG. 8. Marks detection circuits 110, 112 detect the various byte patterns or marks forming references on the sectors read from the tracks of an optical data disk. Mark detection and media control logic circuit 112 receives raw data from the disk, searches for the sector mark pattern provided by X3B11 specifications in the preferred embodiment, and supplies a sector mark found (SMF) signal to one input each of logic OR gates 113 and 115. The remaining input of logic OR gate 115 receives the output of AND gate 111 whose inputs comprise the sector mark found signal (SMF) from circuit 112 and a user selected pseudo sector mark enable signal (PSME) from ODE registers 130 in ODC 102. To the remaining input of gate 113 is applied a psuedo sector mark signal developed by circuit 112. Details on sector mark detection and generation of the sector mark found and pseudo sector mark signals are given in copending applications Ser. No. 08/075,905 for "Sector Mark Pattern Detection for Optical Disk Controller" and 07/810,574, for "Sector Mark Detection in Long Burn Pattern for Optical Data Disks," both filed by the common assignee on even data herewith and incorporated by reference.

The sector mark detection and media control logic circuit 112 is synchronized to an external constant reference clock (2FCLK) that operates at twice the frequency as that of ODC 102 (a requirement of NRZ/RLL 2,7 encoding and decoding), that is, at the frequency of a RDREF clock for timing ODC 102.

The output of gate 113 is supplied to one input of OR logic gate 114, the remaining input of which receives an address mark/sync found signal developed by circuit 110 and supplied through logic circuit 108 when the corresponding reference marks read from the disk are detected.

Marks detection circuit 110 detects patterns of data taken from each sector to identify the presence of the address marks (AM), sync, resyncs (RS) and flag (flag detection is synchronized to 2FCLK). Flag pattern detection is described in detail in copending application Ser. No. 07/810,575, entitled "Repetitive Pattern Detection", also filed on even date herewith and incorporated herein by reference. Circuit 110 receives DATIN, which is a synchronized encoded data input received from an external phase locked loop (PLL)

123 of FIG. 7. This data containing RLL data as well as the AM, sync, resyncs and VFO patterns taken directly from the disk, is synchronized to a clock SYNCLK provided by the PLL. Also supplied to circuit 110 is flag data (FLGDAT) providing flag detection obtained from encoded disk data.

Address marks found or sync marks found by marks detection circuit 110 supplied to logic OR gate 114 are also applied to one input of logic OR gate 116. A signal provided to the other input of gate 116 by marks detection circuit 110 through logic circuit 108 indicates that a resync has been found.

The output of logic OR gate 114, designating either that a sector mark, address mark or sync mark has been found, is supplied to a data section 118 of ODC 102 to enable sector data to be stored and transferred to a host bus. The reference mark found signals, namely, sector mark found (SMF), pseudo sector mark (PSM), address mark found (AMF), sync found (SYNCF), pseudo sync found (PSYNCF), resync found (RSF) and flag found (FF) signals developed by the ODE circuit 104, together with the X3B11 specification, are shown in FIGS. 6(a)–6(g).

The output of gate 116, corresponding to address mark, sync mark and resync mark found signals, is supplied to a new output pin MKF (Marks Found) for diagnostics. This new output pin is made possible as a result of common integration of ODC 102, ODE 104 making available pins previously dedicated to microprocessor address, data and control lines, necessary for separate chips. The MKF pin is one of several diagnostic pins in group 128 of FIG. 5 that enables the operation of the controller 100 to be monitored, and new disk drive control signals developed in response to particular conditions reflected by the marks found signals on the pin. A package for housing the controller (IODC) 100 and diagnostic pins 128 is shown in FIG. 7.

The various reference mark found signals, AM found, sync found and resync found, superimposed on the MKF pin, are distinguishable from each other by differences in byte length and position, as is apparent from the timing diagram of FIGS. 6(d), 6(e) and 6(g). For example, the positions of AM found and sync found signals have a predefined relationship; the byte length (single byte per X3B11 specifications) of the resync found signal is less than that of the others.

Window control logic circuit 120 controls the size of the resync mark detection window in accordance with an aspect of this invention. Other window sizes, namely, those for detecting the sector mark, address mark, sync mark and flag are programmed in window controls store (WCS) unit 122 of ODC data section 108.

RLL decoder 124 receives DATIN from the disk, synchronized to SYNCLK, and converts the disk sector data from RLL 2,7 to NRZ data for supply to the FIFO and synchronization logic circuit 108. The circuit 108 includes the FIFO for transferring NRZ output data to the ODC 102 and into the data section 108. The RLL encoder and marks generation circuit 126 receives data from the data section 118, carries out RLL 2,7 encoding and generates the various marks necessary for applying resync marks and resync bytes to the data field of each sector.

Figure 8:
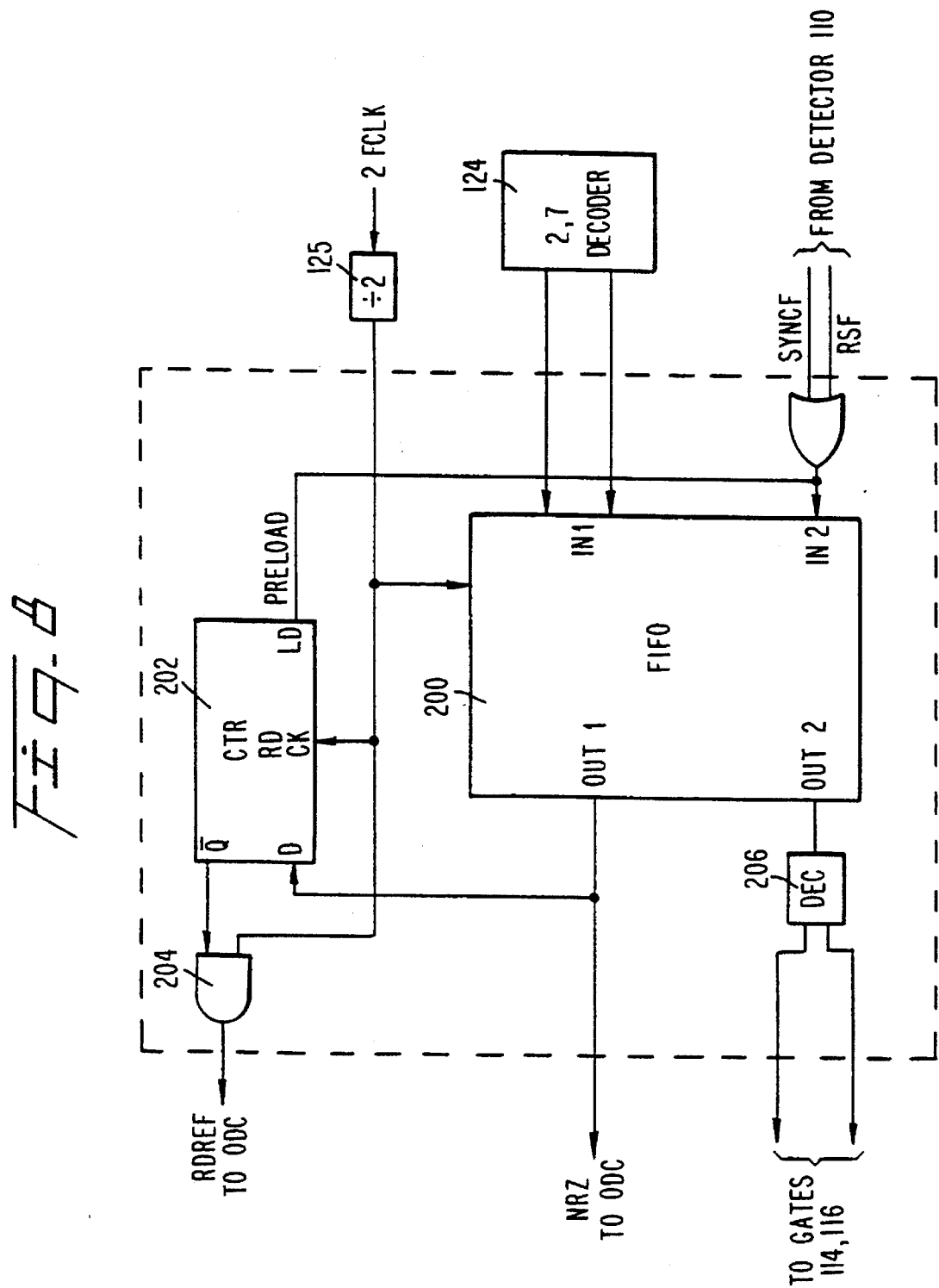
FIG. 8 is a detailed diagram of the FIFO and synchronization logic circuit of FIG. 5.

Circuit 108, shown in more detail in FIG. 8, comprises FIFO 200, which preferably is two bits wide by fourteen bits deep, having two input terminals IN1 and IN2, and two output terminals OUT1 and OUT2. NRZ data decoded from the disk by RLL decoder 124 is supplied to input terminal IN1 to establish one bit stream of the two by fourteen bit FIFO 200. The other input terminal IN2 of the FIFO receives, through an OR gate 208, AM/SYNC and resync (RS) found signals generated by marks detection circuit 110. The marks found signals from gate 208 accordingly are time multiplexed in the second bit stream of the FIFO 200.

Writing of data into the two inputs of FIFO 200 to establish the two bit streams is synchronized to a "write" clock signal obtained from SYNCLK and divided down by a factor of two (the divider circuit for this purpose is not shown). Reading of data from the FIFO 200 in turn is synchronized a "read" clock signal obtained from 2FCLK and divided down by a factor of two by divider 123.

The first bit stream comprising NRZ output data at OUT1 of the FIFO 200 is supplied to the data section 118 of ODC 102. The second bit stream at OUT2 is demultiplexed by decoder 206 and supplied to OR gates 114 and 116, as described previously.

A counter 202, preset to a bit count corresponding to the displacement of a block of the X3B11 data section, in the preferred embodiment (120 or 160 bits for 15 or 20 byte data blocks) by RS bytes from marks detection circuit 110, is downcounted synchronously to RDCLK by NRZ bits appearing at the output of the FIFO. When the counter 202 has downcounted to zero. The output of gate 204 asserts RREF to inhibit further reading of NRZ data from the FIFO by controlling data serialization and deserialization within the ODC 102 in the same manner as the prior art ODC.

Figure 2:
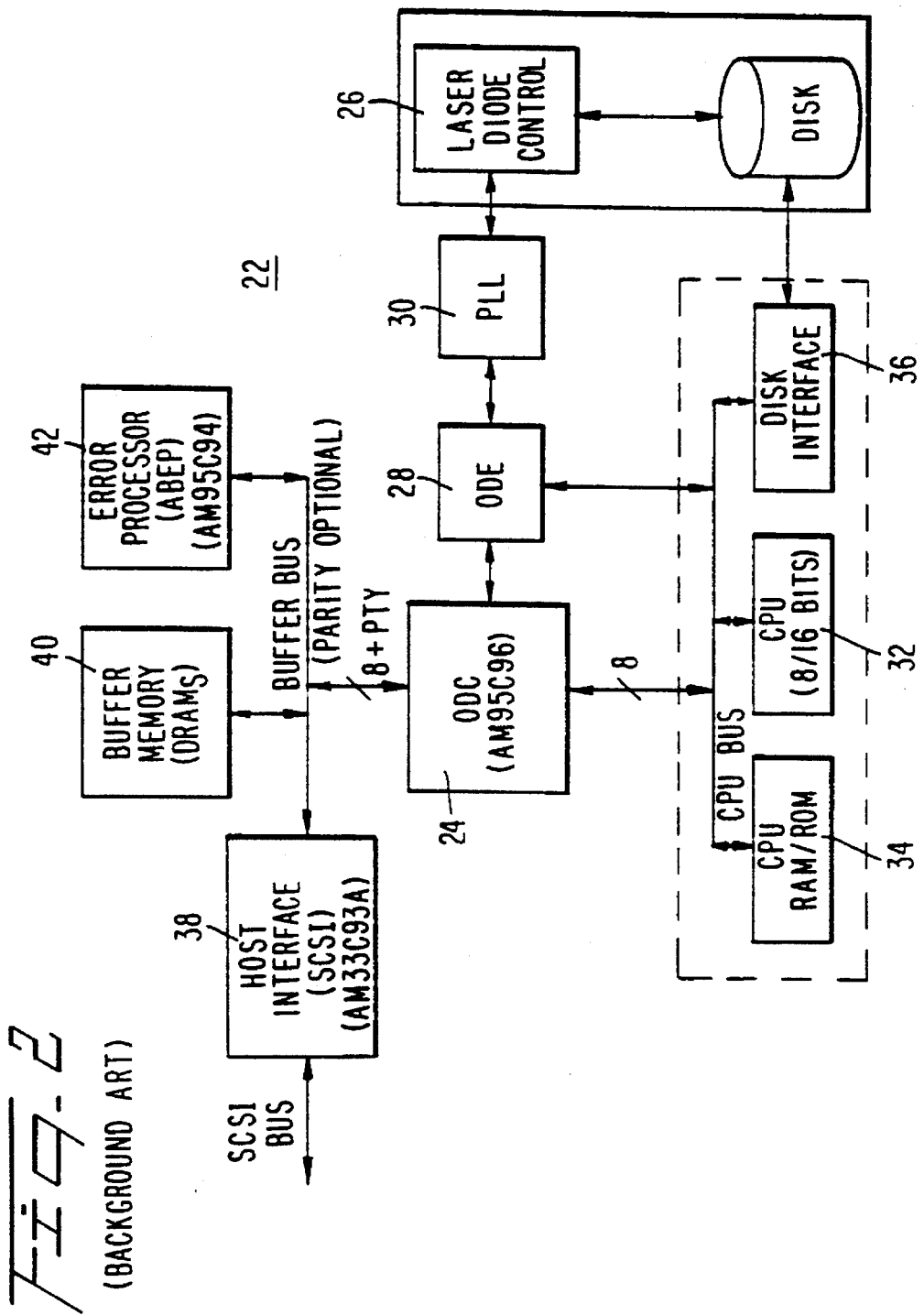
FIG. 2 is a diagram of an optical disk controller system of the prior art comprising separate ODC and ODE chips.
Figure 4:
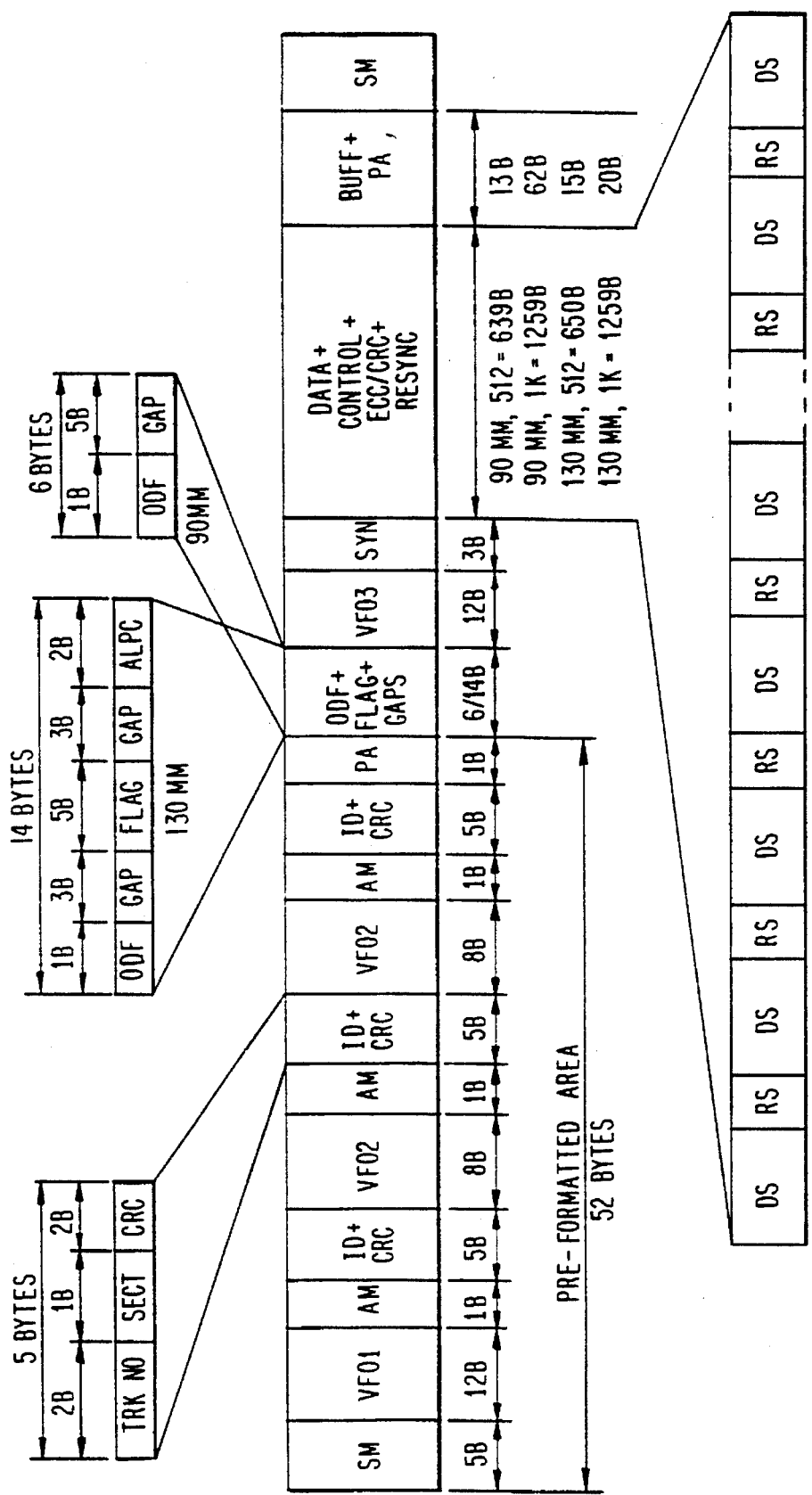
FIG. 4 is a diagram showing X3B11 data format utilized in the preferred embodiment.
Figure 5A:
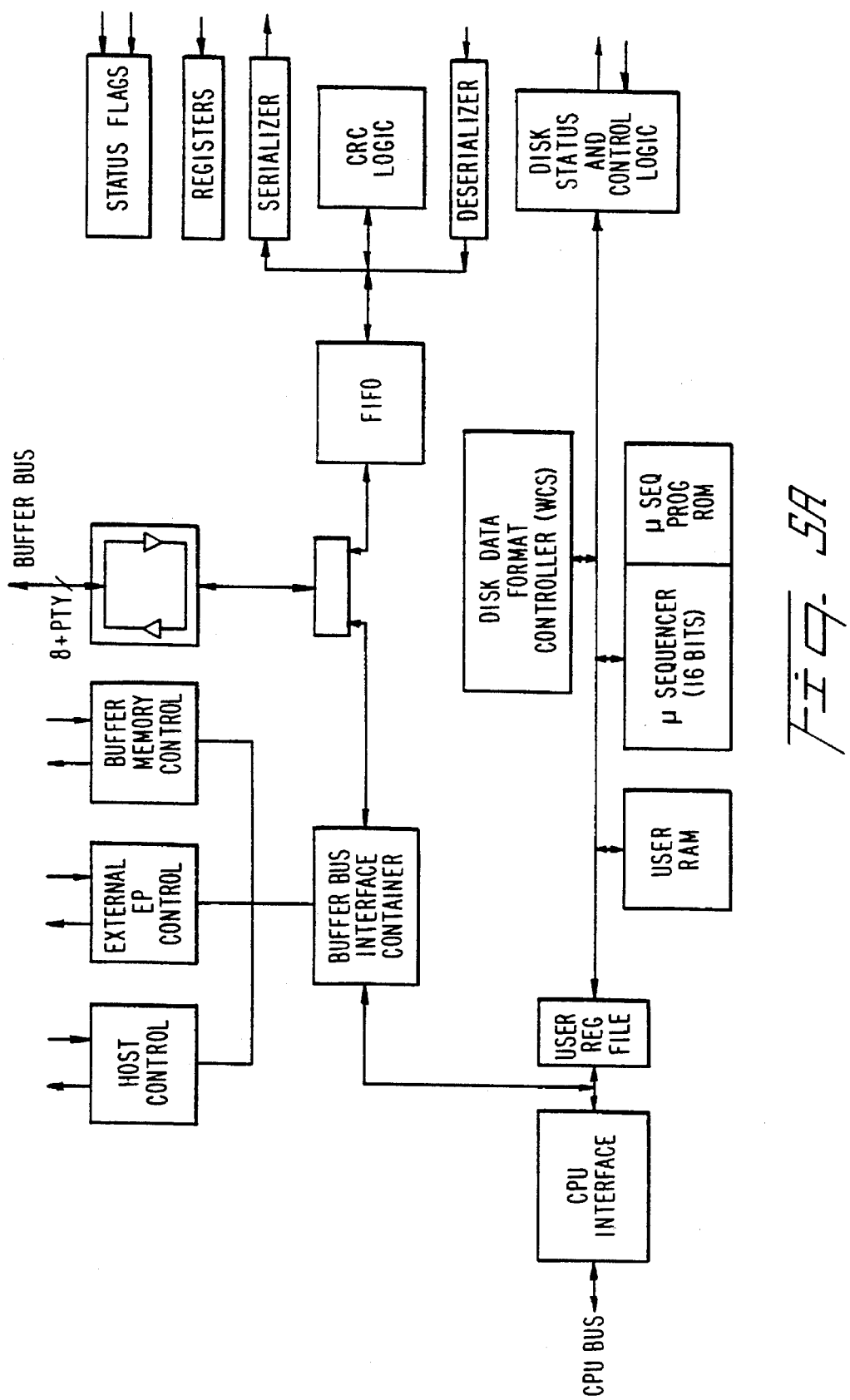
FIG. 5A is a more detailed diagram of the ODC of FIG. 5.

ODC 102, shown in more detail in FIG. 5A, and which is connected to the SCSI side of the controller, supplies data read from the disk by ODE 104 and synchronized to sync marks and resync bytes by circuit 108 together with window control logic 120 and window controls store 122 for storage in buffer and host memories. Because the external clock from which RDREF is derived is a stable source of timing signals, preferrably crystal controlled, and is independent of modes of operation of the controller, the ODC circuit will not "hang up." Hang up occasionally occurs in the prior art counterpart controller of FIG. 2 because it derives ODC timing from a phase locked loop having a tendency to unlock during sector data read operation under certain conditions such as a defect in the disk medium.

Status bits developed by ODE 104 are stored in ODE registers 130 of the ODC 102. As one example, in a data recovery mode of operation that takes place when a sync mark is not found, the identification (ID) of any sectors for which a sync mark was not found is stored in register 130. A CPU (not shown), interfaced to ODC 102, will respond to an interrupt generated by ODE 104 to scan the sector during the same pass through the sector or during a subsequent pass in a data recovery mode of operation described in detail in the copending application entitled "Recovery of Data from Optical Data Disk Sectors having Missing or Defective Synchronization Information," filed by the common assignee on even date herewith and incorporated herein by reference.

In accordance with an important aspect of the invention, ODE commands for controlling operation of the ODE circuit 104 are stored in the write control store (WCS) of data section 118 in ODC circuit 102. The ODE commands, preferably stored in the form of a three bit long (0–2) ODE control field of a 48 bit WCS word including bits for controlling write and read gates, produce the ODE commands which control the generation and detection of the sector mark, address mark, sync mark, flag and data encode/decode. The WCS word format and ODE commands are shown in tables II and III below.

TABLE II

WCS Word Format

| 47 | 41 40 | 36 35 | 32 31 | 24 23 | 17 |
|---|---|---|---|---|---|
| Branch Address | Branch Control Code | Loop Control Code | Pattern Field | Count/General Control Fields | |

| 16 | 13 12 | 11 10 | 6 5 | 3 2 | 0 |
|---|---|---|---|---|---|
| ECC/CRC Control Field | General Output Field | Decoded Control Field | Input/Output Field | ODE Control Field | |

TABLE III

ODE Commands

| ODE2 | ODE1 | ODE0 | RGATE | WGATE | COMMAND |
|---|---|---|---|---|---|
| 0 | 0 | 0 | X | X | Idle |
| 0 | 0 | 1 | 1 | 0 | Detect Address Mark (Window) |
| 0 | 0 | 1 | 0 | 1 | Generate Address Mask |
| 0 | 1 | 0 | 0 | 0 | Detect FLAG (Window) |
| 0 | 1 | 1 | 0 | 0 | Detect Sector Mark (Window) |
| 0 | 1 | 1 | 0 | 1 | Generate Sector Mark |
| 1 | 0 | 0 | 1 | 0 | Detect SYNC Mark (Window) |
| 1 | 0 | 1 | 1 | 0 | Data Field Read (Window) |
| 1 | 0 | 1 | 0 | 1 | Data Field Write |
| 1 | 1 | 0 | X | X | RESERVED |
| 1 | 1 | 1 | X | 0 | Address Mark Missing Flag |

The ODE command bits are made externally available on output pins CMD (0–2) of pin group 128 for diagnostics and program debugging. When these pins are not used to carry ODE command bits, they can be defaulted to general pins (GENO (3–5).

The IODC 100 incorporates a number of status flags that are supplied by ODE 104 to ODC 102 for storage in registers 130. The preferred embodiment provides twelve such status flags on two flag buses of seven and five flag lines, respectively.

The group 128 of external pins in conjunction with the twelve status flag lines add quite a bit of flexibility to the controller 100, as they enable controller functions to be analyzed for debugging or other purposes such as to control a disk drive or to abort operation of the controller, if necessary, by an abort signal supplied to the ODC 102 by the ODE 104, as shown in FIG. 5. It is apparent in this figure that abort is carried out immediately since additional layers of processing necessitated by processor circuits residing on separate chips of the prior art are eliminated.

Accordingly, numerous advantages and improvements in operation of an optical data disk controller are ODE circuits resides in data section 118 and main sequencer (FIG. 5A) of the ODC. Because there is no necessity to transfer signals between chips, speed of operation of the controller is improved, and interchip signal driving and buffering circuitry is eliminated. Of particular utility, additional pins made available by elimination of redundant pin functions enables diagnostics and debugging to be performed, both by the user and by a factory prior to product shipment.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed:

1. An integrated optical data disk controller for an optical data disk having tracks with data arranged in sectors, comprising on a common semiconductor substrate:

optical encoder/decoder (ODE) circuitry for finding reference marks and decoding data from a bit stream supplied from said disk and for supplying reference marks and encoding and supplying data to said optical data disk;

optical data controller (ODC) circuitry interconnected with said ODE and a host interface and supplying disk read/write data and control signals to an external disk drive unit; and signal flow paths for transferring signals between said ODC and ODE, said common semiconductor substrate having diagnostic pins coupled to said ODE and ODC for enabling monitoring of said integrated optical data disk controller combining functions of said ODE and ODC on said common semiconductor substrate.

2. The integrated optical data disk controller of claim 1, wherein said ODE includes means for generating internal signals corresponding to said reference marks found on said optical data disk; and at least one output pin of said diagnostic pins for transferring said internal signals outside said common semiconductor substrate.

3. The integrated optical data disk controller of claim 1, wherein said ODE includes synchronization means for controlling said ODC to read only a preselected number of bits of data obtained from said optical data disk.

4. The integrated optical data disk controller of claim 1, wherein said ODE includes a decoder for converting data obtained from said disk to non-return-to-zero (NRZ) data, and a first in-first out (FIFO) memory for supplying the NRZ data to said ODC.

5. The integrated optical data disk controller of claim 2, wherein said internal signals corresponding to said reference marks are supplied to an output pin common for said internal signals.

6. The integrated optical data disk controller of claim 1, wherein said ODC circuit includes a data section storing commands for controlling functions of said ODE circuit.

7. The integrated optical data disk controller of claim 6, including external pins coupled to said data section for monitoring said commands from outside said common semiconductor substrate.

8. The integrated optical data disk controller of claim 6, wherein said ODE circuit includes window control logic for establishing windows of predefined sizes for searching disk sectors to find various reference marks, and further wherein said data section of said ODC circuit stores data predefining said predefined sizes.

9. The integrated optical data disk controller of claim 8, wherein said ODE circuit includes synchronization logic means responsive to sync and resync signals developed by said ODE circuit for supplying decoded data from said optical data disk to said ODC circuit;

said controller includes a crystal-controlled clock source; and said ODC and said synchronization logic means are synchronized to said clock source.

10. The controller of claim 9, including a divider circuit for dividing down a clock signal provided by said clock source to obtain a clock signal (RDREF), and wherein said clock signal is supplied to said ODC circuit and said synchronization logic means.

11. The integrated optical data disk controller of claim 9, wherein said ODE circuit includes means controlled by said window control logic for detecting reference marks taken from said disk, and in response, generating corresponding "mark found" signals; and synchronization logic means for supplying decoded data from said optical data disk to said ODC circuit;

wherein said synchronization logic means is synchronized to said "mark found" signals.

12. An integrated optical data disk controller for an optical data disk having tracks with data arranged in sectors, comprising on a common semiconductor substrate:

optical encoder/decoder (ODE) circuitry for detecting reference marks and decoding data read from said optical data disk and for encoding and supplying data to said optical data disk; and optical data controller (ODC) circuitry interconnected with said ODE and a host interface and providing disk read/write data and control signals to an external disk drive unit;

said ODC circuit including a data section storing ODE commands for controlling functions of said ODE circuit, said common semiconductor substrate having diagnostic pins coupled to said ODE and ODC for enabling monitoring of said integrated optical data disk controller combining functions of said ODE and ODC on said common semiconductor substrate.

13. The controller of claim 12, wherein said diagnostic pin includes external pins coupled to said data section for monitoring said ODE commands from outside said common semiconductor substrate.

14. The controller of claim 12, wherein said ODE circuit includes synchronization logic means responsive to sync and resync signals developed by said ODE circuit for supplying decoded data from said optical data disk to said ODC circuit;

said integrated optical data disk controller further includes a crystal-controlled clock source; and said ODC and said synchronization logic means are synchronized to said clock source.

15. The controller of claim 14, including a divider circuit for dividing down a clock signal provided by said clock source to obtain a clock signal (RDREF), and wherein said clock signal is supplied to said ODC circuit and said synchronization logic means.

16. The integrated optical disk controller of claim 1, wherein said ODC circuitry is supplied by said ODE circuitry with an abort signal to immediately abort operations of said integrated optical data disk controller.

17. The integrated optical disk controller of claim 12, wherein said ODC circuitry is supplied by said ODE circuitry with an abort signal to immediately abort operations of said integrated optical data disk controller.

* * * * *